Dec. 18, 1923.

F. A. KING

SPOTLIGHT

Filed March 18, 1922

INVENTOR.
Frank A. King
BY
Mason, Fenwick & Lawrence
ATTORNEYS.

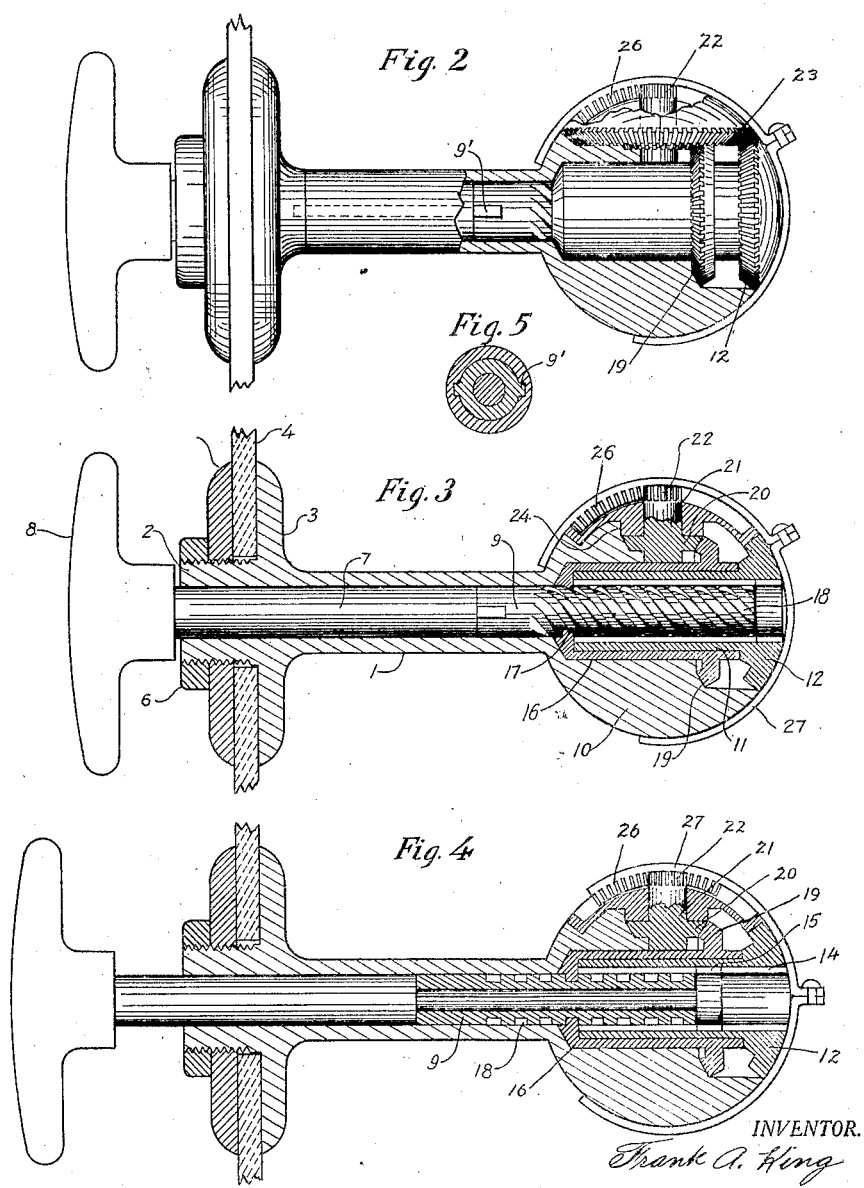

Dec. 18, 1923.　　　　　　　　　　　　　　　　1,477,961
F. A. KING
SPOTLIGHT
Filed March 18, 1922　　　3 Sheets-Sheet 3
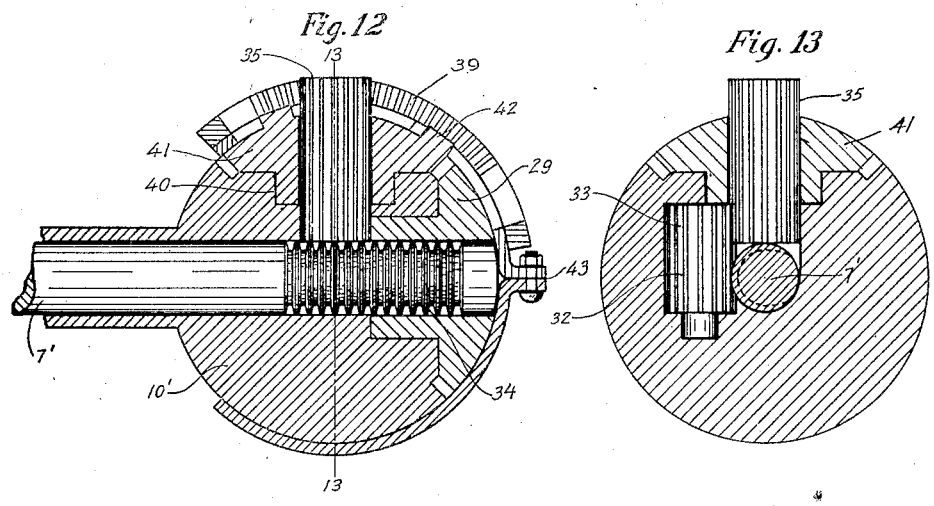
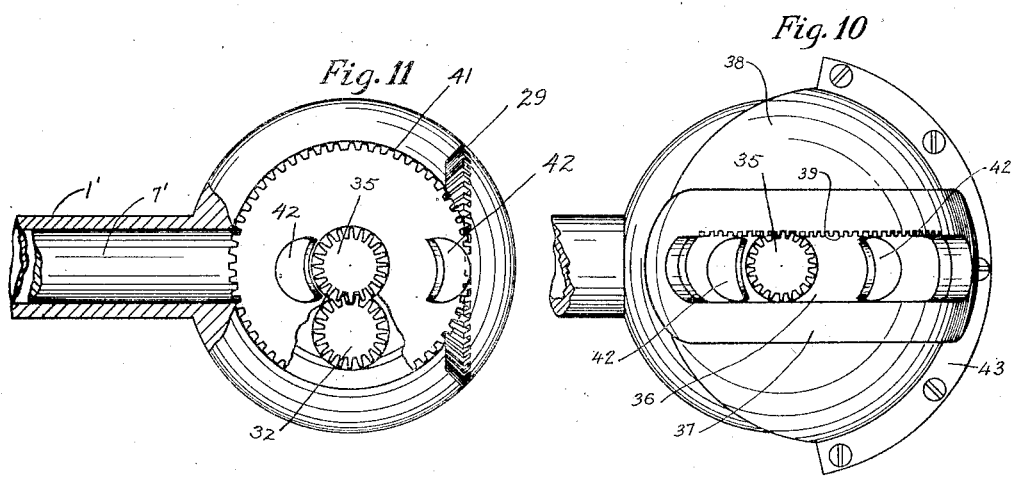
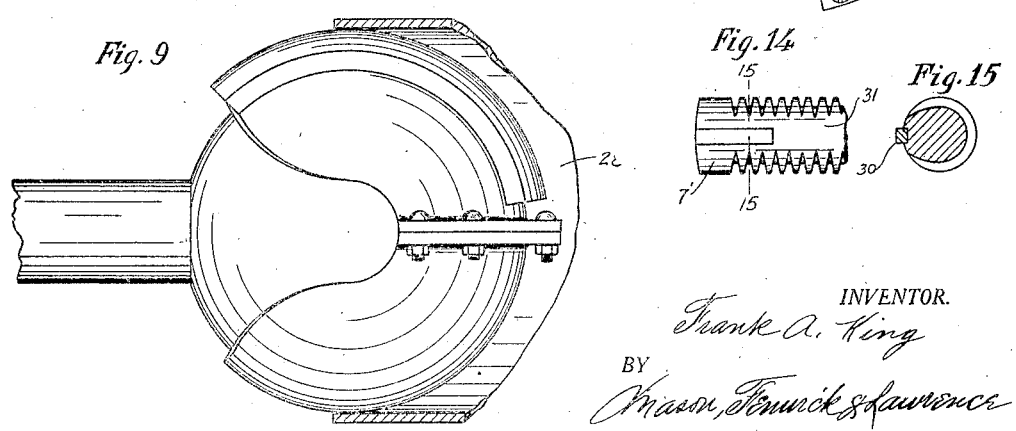
INVENTOR.
Frank A. King
BY
Mason, Fenwick & Lawrence
ATTORNEYS.

Patented Dec. 18, 1923.

1,477,961

UNITED STATES PATENT OFFICE.

FRANK A. KING, OF ENGLEWOOD, COLORADO.

SPOTLIGHT.

Application filed March 18, 1922. Serial No. 544,912.

*To all whom it may concern:*

Be it known that I, FRANK A. KING, a citizen of the United States, residing at Englewood, in the county of Arapahoe and State of Colorado, have invented certain new and useful Improvements in Spotlights; and I do hereby declare the following to be a full, clear, and exact description of the invention, such as will enable others skilled in the art to which it appertains to make and use the same.

This invention relates to new and useful improvements in lights, and more particularly to what is known as spot lights for motor vehicles, the main object of the invention being the provision of mounting and operating means whereby the light may be mounted on a wind shield or the like in such manner that the light itself will be forward of the wind shield, with an operating handle behind the wind shield, means being provided whereby the light may be turned to any direction desired by movement of the handle.

A further object of the invention is the provision of a spot light mounted on a ball and socket joint carried by a stationary support having means within the support and joint for turning the light upon said joint to the direction desired.

A further object of this invention is the provision of a spot light having a new and improved means including a ball and socket joint with operating means partly within said joint for manipulating the light whereby the same may be elevated and depressed or moved from side to side, or the said two movements may be combined and resolved, at the will of the operator by the use of a single operating handle.

With the above and other objects in view, the invention consists in the novel features of construction, combination and arrangement of parts hereinafter more fully set forth, pointed out in the claims and shown in the accompanying drawings, in which:

Fig. 2 is a detail side elevation, parts thereof broken away and illustrated in section;

Fig. 3 is a longitudinal sectional view, parts being disclosed in elevation;

Fig. 4 is a longitudinal sectional view, parts of the device which were formerly illustrated in elevation in Fig. 3 being now disclosed in cross section;

Fig. 5 is a detail transverse sectional view of the operating shaft and sleeve and housing enclosing said shaft;

Fig. 9 is a side elevation illustrating a slightly modified form of the invention;

Fig. 10 is a top plan view;

Fig. 11 is a similar view, the socket portion being omitted.

Fig. 12 is a longitudinal sectional view of the modification shown in Figs. 9 and 11 inclusive;

Fig. 13 is a transverse sectional view taken on the line 13—13 of Fig. 12;

Fig. 14 is a detail side elevation of one end of the shaft, and

Fig. 15 is a transverse section taken on the line 15—15 of Fig. 14.

Figure 1:
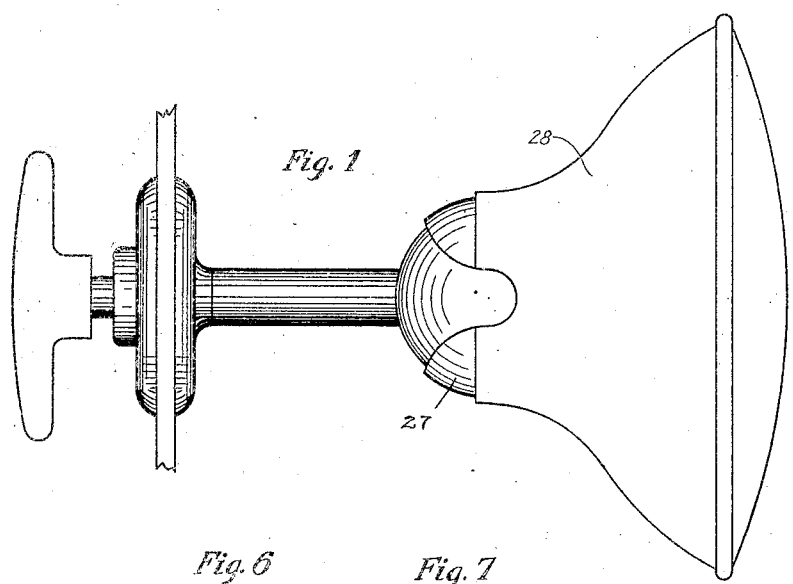
Figure 1 is a top plan view of a light constructed in accordance with my invention.
Figure 6:
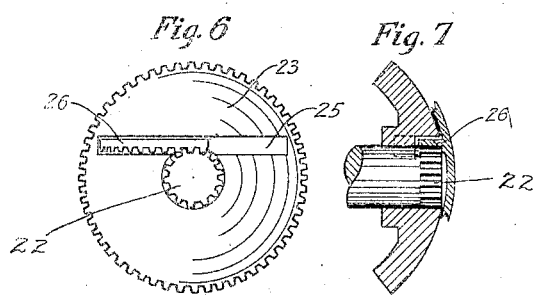
Fig. 6 is a top plan view of one of the operating gears illustrating the relative position of the operating pinion with respect to the gear.
Figure 7:
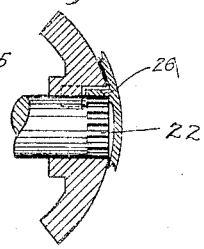
Fig. 7 is a transverse sectional view of the gear shown in Fig. 6, the operating pinion being disclosed in elevation.
Figure 8:
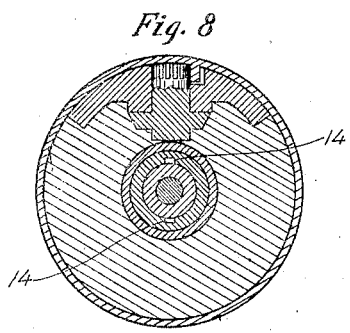
Fig. 8 is a transverse sectional view of the ball and socket connection.

In the construction of my improved spot light, I provide a supporting housing or sleeve 1 having a bearing sleeve 2 formed integral with one end of the supporting sleeve and further provided with an annular flange 3. In mounting the supporting element upon the windshield 4 the windshield is first provided with an opening adapted to receive the bearing 2 and the flange 3 is fitted tightly against one face of the windshield 4. In order to prevent movement on the part of the bearing 2, a plate 5 is mounted upon the side of the windshield opposite the flange 3 and this plate 5 is retained in position by means of a stop nut 6 which is threaded upon the outer end of the bearing sleeve 2 and bears against the plate 5. From this it will be apparent that when the stop nut 6 is screwed tightly onto the bearing sleeve 2, the supporting sleeve 1 will be securely positioned with respect to the windshield 4.

Mounted for rotation within the sleeve 1 is an operating shaft 7 having secured to its outer end a handle member 8. The portion of the shaft 7 within and adjacent the ball, next described, is reduced as clearly shown at Fig. 4 and revolubly mounted thereon is sleeve 9 hereinafter described. Sleeve 9 is provided with keys 9' which slide in corresponding key ways in sleeve 1 to hold sleeve 9 against revolution with shaft 7 while permitting longitudinal movement thereof with the shaft. Mounted upon the outer end of the sleeve 1 is a ball member 10 having a transverse opening therethrough in which the shaft and sleeve 9 are mounted for rotating and sliding movement. The ball 10 is provided with a socket or opening therein which is substantially larger than the end of the shaft 7 which extends into the ball and mounted within this opening and surrounding the inner end of the shaft 7 and sleeve 9 is a sleeve 11 having upon its outer end a bevel gear 12. This sleeve 11 is provided with opposing longitudinal grooves 14 and the end of the shaft 7 is provided with lugs 15 adapted to be fitted into said grooves whereby turning movement of the shaft 7 will impart turning movement to the sleeve 11 and bevel gear 12.

Mounted upon the sleeve 11 for rotation is a third sleeve 16. The inner end of this sleeve is provided upon its interior with an annular pinion surface 17 adapted to engage with the spiral grooves 18 on the sleeve 9 whereby upon longitudinal movement of the shaft 7, a rotary movement will be imparted to the sleeve 16. The sleeve 16 carries adjacent its outer end a bevel gear 19 adapted to mesh with a gear 20 carried by a stub shaft 21, the outer end of said stub shaft having a pinion 22 formed thereon.

This stub shaft 21 is mounted within a central opening formed within a substantially arcuate shaped gear 23, the outer contour of the gear 23 corresponding to the contour of the ball 10 as illustrated in Figs. 2 to 4 inclusive, the gear 23 being provided with a sleeve 24 which bears upon the outer face of the gear 20 carried by this stub shaft 21. The gear 23 is provided upon one side of its center with a transverse groove 25 and extending into this groove is a rack 26 adapted to cooperate with the pinion 22 upon the outer end of the stub shaft 21, said rack being carried by the socket 27 which encloses the ball 10. The socket 27 further supports the light member 28. From this it will be apparent that when rotary movement is imparted to the sleeve 16 through longitudinal movement of the shaft 7, the gear 19 will be simultaneously moved with the sleeve 16 and impart movement to the stub shaft 21 through the gear 20 carried by said stub shaft, thus a rotary movement is imparted to the pinion 22 and as said pinion meshes with the rack 26, the socket 27 will be moved about the ball 10 and impart a vertical movement to the light member 28, moving this light whereby the rays of the same may be raised or lowered at the will of the operator.

Upon rotary movement of the shaft 7 through manual power being applied to the handle member 8, a rotary movement is imparted to the gear 12 and as this gear meshes with the gear 23, a rotary movement will be imparted to the gear 23. It will be noted that as the rack 26 which is carried by the socket 27, projects into the groove 25 in the gear 23, rotation of this gear 23 will move the socket in a substantially horizontal plane, moving the light 28 in the same direction whereby the rays from this light may be moved from side to side through the rotation of the shaft 7 at the will of the operator.

From the above description, it will be readily apparent that a vertical movement can be readily imparted to the light 28 at the will of the operator by grasping the handle member 8 and reciprocating the operating shaft 7 within the bearing sleeve 1, this movement imparting rotary movement in a vertical plane to the socket 27, as set forth above, and by rotating the shaft 7 through the medium of the handle 8 a horizontal movement will be imparted to the light. As this handle member 8 is preferably located in a position adjacent to the seat of the driver, the driver can readily actuate the light 28 when required.

In Figs. 9 to 15 inclusive, I have illustrated a slightly modified form of the invention which includes a bearing sleeve 1' in which is mounted the operating shaft 7'.

Mounted upon the outer end of the sleeve 1' is a ball member 10' having a transverse opening in which the shaft 7' is mounted for rotating and sliding movement. Fitted into a suitable bearing within the ball 10' and mounted for sliding movement upon the shaft 7' is a bevel gear 29, said gear being provided with a key-way cooperating with the key member 30 arranged within the substantially flat face 31 of the outer end of the shaft 7' whereby the shaft 7' may readily slide within the gear 29 but upon rotation of the shaft 7' the gear 29 will rotate therewith.

Arranged within the ball 10' and disposed at right angles to the shaft 7' is a pinion 32 having longitudinally disposed ribs 33 formed thereon adapted to co-mate with the annular ribs 34 on the shaft 7' whereby through sliding movement of the shaft 7' rotary movement will be imparted to the pinion 32. Mounted within the ball and disposed above the shaft 7' and arranged at right angles thereto is a second pinion 35, said pinion 35 being mounted parallel with the pinion 32 and having longitudinal ribs adapted to mesh with the ribs 33 on the pinion 32 whereby upon rotation of the pinion 32 through the medium of the shaft 7' rotary movement is imparted to the pinion 35. The outer end of the pinion 35 is extended into the slot 36 formed in an arcuate rack member 37, said rack member being carried by the socket 38 which partially encloses the ball 10'. Attention is called to the fact that one side of the slot 36 is provided with rack teeth 39 adapted to mesh with the ribs on the pinion 35 whereby upon rotation of the pinion an oscillating movement is imparted to the socket 38.

Mounted within a bearing 40 and embracing the pinion 35 is a bevel gear 41 which is arranged whereby to engage with the bevel gear 29 whereby upon rotation of the shaft 7' movement is imparted thereto through the medium of the bevel gear 29. The bevel gear 41 is provided with spaced lugs 42 fitting into the slot 36 of the rack 37 whereby rotating movement of the gear 41 will impart an oscillating movement to the socket 38 at right angles to the movement imparted through the pinion 35. Mounted upon this socket 38 and secured thereto is the lamp 28 and from the above description taken in connection with the accompanying drawings, it will be readily apparent that when the handle 8 is moved toward or away from the windshield by the operator, a reciprocating movement will be imparted to the shaft 7', thus imparting a rotary movement to the pinions 32 and 35 and through the engagement of the pinion 35 with the rack 37 which is carried by the socket 38 movement will be imparted to the lamp 28 in a vertical plane whereby said lamp may be readily elevated or depressed at the will of the operator. If it is desired to move the lamp in a horizontal plane or from side to side, the handle 8 is rotated either to the right or left of the operator and through this movement the shaft 7' is rotated, thus imparting a rotating movement to the gears 29 and 41 and by having the lugs 42 disposed within the slot 36 a substantially horizontal movement is imparted to the socket 38 which in turn imparts a similar movement to the lamp in a horizontal plane.

The socket member 38 as illustrated in the accompanying drawings, is preferably made in two sections, each section being provided with an arcuate flange portion bolted or otherwise connected as shown at 43 whereby the several gears and pinions may be arranged in their proper relative positions within the bearings provided therefor in the ball 10' and the socket 38 then arranged over the ball with the end of the pinion 35 extending into the slot 36 in the rack 37. This rack 37 may be attached to the socket 38 in any suitable manner and it is understood that the section of the socket to which the rack is applied is provided with an arcuate slot co-mating with the slot 36 in the rack, as illustrated in Figs. 10 and 12. Various ways and means may be provided for mounting my improved spot light, but it is preferred to have the same attached to the windshield in any suitable manner. In the present instance, it is shown as clamped onto the windshield through the medium of the flange 3 and plate 5 which are held in place by means of the nut 6.

It will be understood that starting with the lamp at any given point a longitudinal movement of the shaft 7 will move the lamp in one plane including that point, while a rotary movement of the shaft will move the lamp through said point in a plane substantially at right angles to the first mentioned point, and it will be obvious that with such a construction a combination and resolution of the said two movements may be made which will result in moving the lamp in a direct line or in any other line of movement desired from any point within the limits of its motion to any other point within those limits. While the description is generally limited to movement in two planes at right angles to each other it will be understood that these two movements being made possible the light may be made to move in any desired manner or on any desired line from one point to another and that its movement is by no means limited to two right angle planes.

I claim:

1. An adjustable light support including an operating shaft, a lamp, a ball and socket connection between the shaft and lamp, a sleeve mounted upon the shaft, a rotatable pinion carried by the ball, a rack carried by the socket, means forming connection between the shaft and sleeve whereby longitudinal movement of the shaft will impart rotary movement to the sleeve and additional means connecting the sleeve with the pinion whereby to rotate said pinion, imparting movement to the socket whereby to move the lamp, from any given point, in one plane and additional means forming connection between the socket and shaft whereby upon rotation of the shaft the lamp will be moved, from said point, in a plane at substantial right angles to said first mentioned plane.

2. An adjustable light support including an operating shaft, a lamp, a ball and socket connection between the shaft and lamp, a sleeve mounted upon the shaft and keyed for rotation therewith, a gear at one end of said sleeve, a second gear co-mating therewith, means forming connection between the second gear and the socket whereby upon rotation of the shaft the lamp will be caused to move, from any given point, in one plane and additional means forming connection between the shaft and the socket whereby upon longitudinal movement of the shaft the lamp will be moved, from said point, in a plane at substantial right angles to the first mentioned plane.

3. An adjustable light support including an operating shaft, a lamp, a ball and socket connection between the shaft and lamp, a sleeve mounted upon the end of the shaft projecting into the ball, means forming connection between the shaft and sleeve whereby to rotate said sleeve upon longitudinal movement of the shaft, a pinion at right angles to the sleeve, a gear on the pinion, a second gear carried by the sleeve co-mating with the gear on the pinion, an arcuate gear mounted within the ball for rotation upon the pinion, a groove within said arcuate gear, a rack having connection with the socket and extending into said groove and co-mating with the pinion whereby upon longitudinal movement of the shaft the lamp will be moved, from any given point, in one plane and means forming connection with the shaft and the arcuate gear whereby upon rotating movement of the shaft the lamp will be moved, from said point, in a plane at substantial right angles to first mentioned plane.

4. A device of the class described including an operating shaft, a ball and socket joint supported at one end thereof, a lamp mounted upon the joint for movement with the socket portion, a rack member carried by the socket portion of the joint, a bevel gear arranged within the joint and mounted upon the shaft for rotation therewith, a second bevel gear disposed at right angles to the first gear and meshing therewith, means forming connection between the rack and the second gear whereby rotation of said gears through rotary movement of the shaft will move said lamp, from any given point, in one plane and additional means forming connection between the shaft and the rack whereby longitudinal movement of the shaft will impart movement to the lamp, from said point, in a plane at substantial right angles to said first mentioned plane.

In testimony whereof I affix my signature.

FRANK A. KING.